Sept. 12, 1961   A. W. ELLING   2,999,357
REACTION MOTOR

Filed Sept. 16, 1958   4 Sheets-Sheet 1

Albert W. Elling
INVENTOR.

BY *Clarence A. O'Brien*
and *Harvey B. Jacobson*
Attorneys

Sept. 12, 1961     A. W. ELLING     2,999,357
REACTION MOTOR
Filed Sept. 16, 1958     4 Sheets-Sheet 2
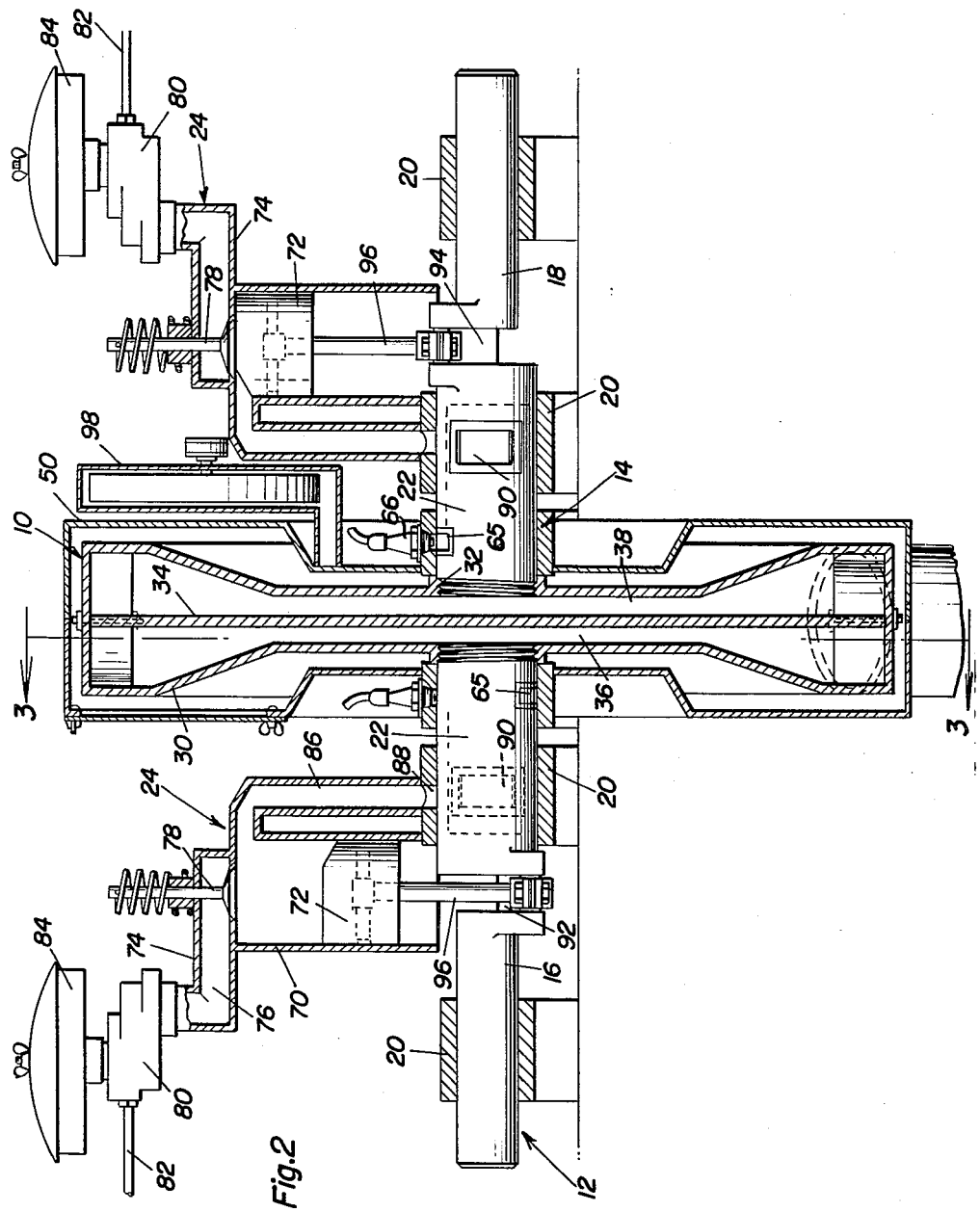
Albert W. Elling
INVENTOR
BY *Clarence A. O'Brien*
*and Harvey B. Jacobson*
Attorneys Sept. 12, 1961 A. W. ELLING 2,999,357
REACTION MOTOR
Filed Sept. 16, 1958 4 Sheets-Sheet 3

Albert W. Elling
INVENTOR.

BY *Clarence A. O'Brien*
*and Harvey B. Jacobson*
Attorneys

Sept. 12, 1961     A. W. ELLING     2,999,357
REACTION MOTOR
Filed Sept. 16, 1958                   4 Sheets-Sheet 4
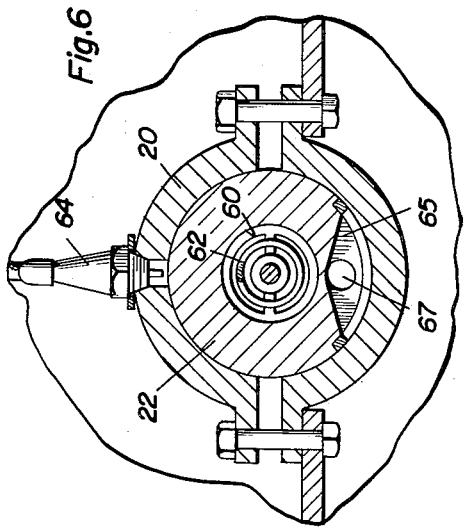
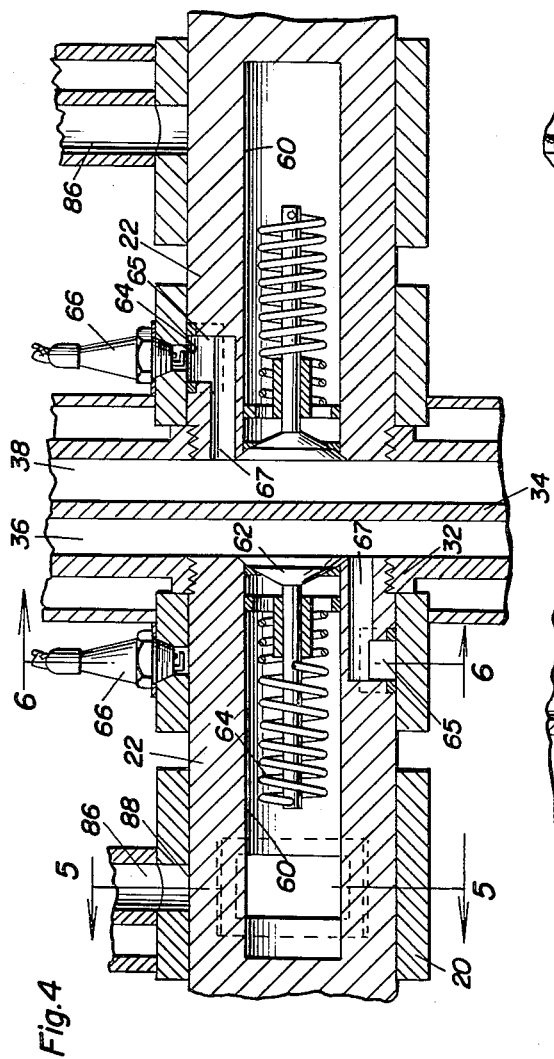
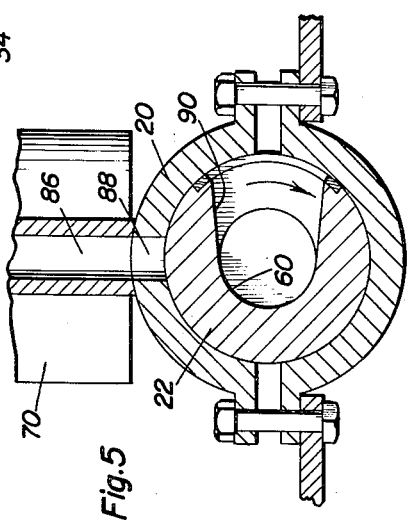
Albert W. Elling
INVENTOR.
BY *Clarence A. O'Brien*
*and Harvey B. Jacobson*
Attorneys 本
United States Patent Office 2,999,357
Patented Sept. 12, 1961

2,999,357
REACTION MOTOR
Albert W. Elling, Rte. 2, Hampton, Iowa
Filed Sept. 16, 1958, Ser. No. 761,381
17 Claims. (Cl. 60—39.34)

This invention comprises a novel and useful reaction motor and more particularly relates to a reaction motor having improved means for supplying compressed combustible charges into combustion chambers, igniting the same and delivering these charges into a rotor for effecting rotation thereof.

The primary object of this invention is to provide a reaction motor having a highly effective means for producing and firing charges of a combustible mixture therein and employing the products of combustion to produce by reaction rotation of a rotor and drive shaft.

A further object of the invention is to provide a reaction motor wherein a pair of reciprocating pistons operate to successively compress combustible mixtures for subsequent use in producing power in the engine.

Yet another object of the invention is to provide a reaction motor in accordance with the foregoing objects wherein a pair of compressor elements successively prepare combustible mixtures; together with means within the rotating shaft of the engine for igniting the combustible charges and delivering the same to a rotor element for producing power therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical transverse sectional view taken substantially upon the plane indicated by the section line 2—2 of FIGURE 1 and showing the combustible mixture producing means and the power rotor of the apparatus;

FIGURE 4 is an enlarged detail view in vertical longitudinal section through the central portion of the power shaft and of the reaction rotor thereon and showing in particular the manner in which the combustible mixture charges are ignited and delivered to the reaction rotor for effecting rotation thereof;

Figure 1:
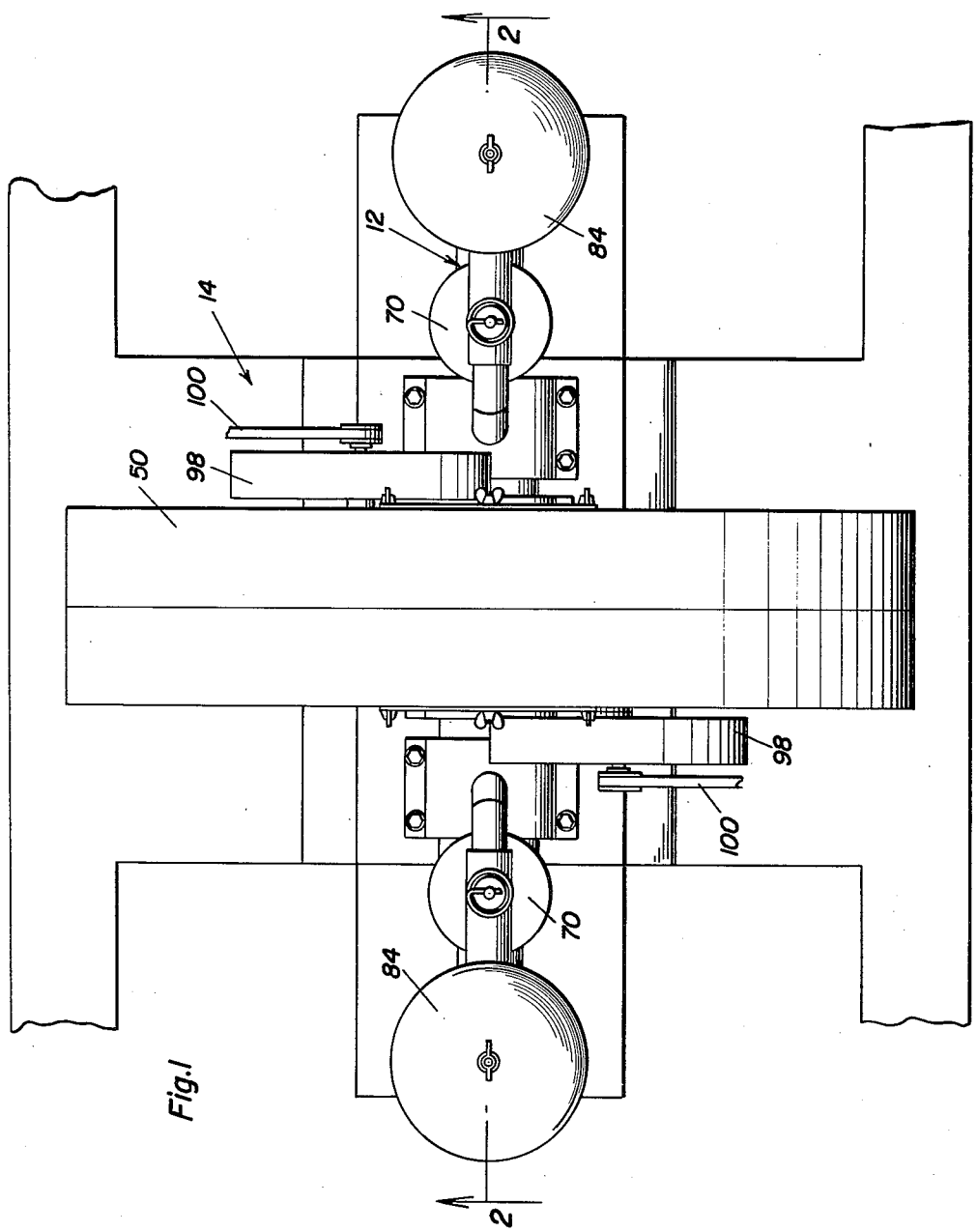
FIGURE 1 is a top plan view of an embodiment of a reaction motor incorporating therein the principles of this invention.
Figure 7:
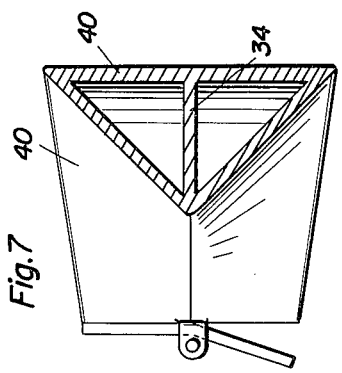
Figure 8:
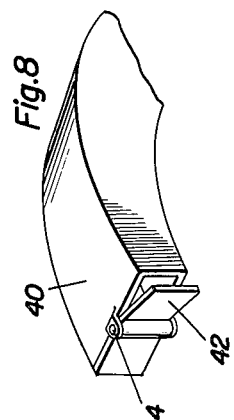
Figure 3:
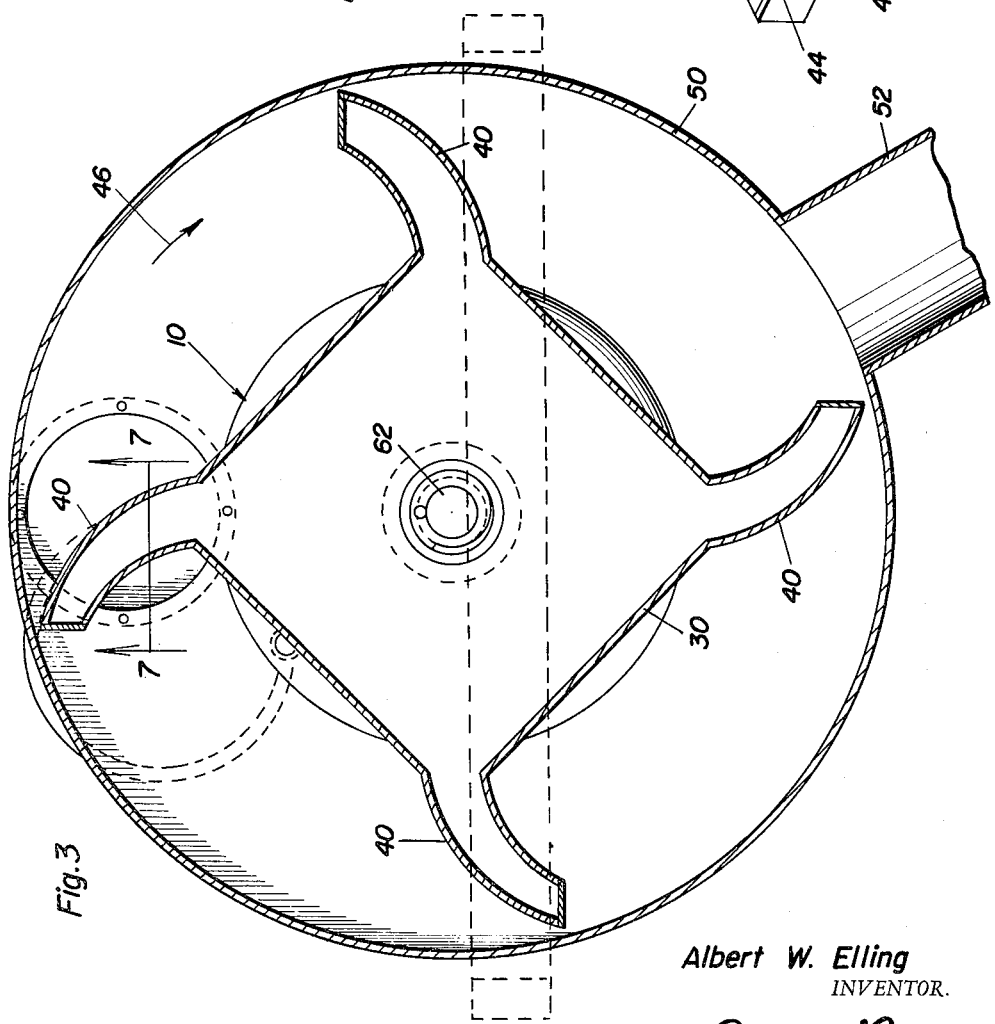
FIGURE 3 is a vertical transverse sectional view taken substantially upon the plane indicated by the section line 3—3 of FIGURE 2 and showing in particular the internal construction of the reaction rotor of the invention.

FIGURES 5 and 6 are vertical transverse sectional views taken respectively upon the planes indicated by the section lines 5—5 and 6—6 of FIGURE 4 and showing the fuel inlet manifold and ignition manifold in accordance with the invention;

FIGURE 7 is a horizontal sectional detail view taken substantially upon the plane indicated by the section line 7—7 of FIGURE 3 and showing the construction and shape of the exhaust ducts of the reaction rotor; and FIGURE 8 is a fragmentary perspective view of the end of one of the exhaust ducts of the reaction rotor showing the discharge valve thereof.

The reaction motor in accordance with this invention and as illustrated in the accompanying drawings will be seen, by particular reference to FIGURE 2, to include a rotor designated generally by the numeral 10 together with a shaft indicated at 12 and a stator to which the numeral 14 makes general reference.

The shaft preferably comprises a pair of sections at 16 and 18 which are disposed in spaced alinement with each other, being supported in suitable journal means or bearings as at 20 at suitably spaced locations in the stator element.

At their adjacent portions, the sections are diametrically enlarged to provide cylindrical bodies each designated by the numeral 22. These bodies are journaled in some of the journal means 20 previously referred to.

Mounted upon the stator on opposite sides of the rotor 10 are a pair of combustible mixture compressor units each indicated at 24 by means of which a combustible mixture is produced to be thereafter delivered to the interior of the rotor to furnish power for operating the same as set forth hereinafter.

Referring now especially to FIGURE 3 it will be observed that the rotor 10 includes a hollow body 30, which as shown is generally square in cross section, although any desired shape may be provided. As the central or hub portion of the rotor, see FIGURES 2 and 4, the two opposite side walls of the rotor are provided with internally threaded flanges or hubs 32 which are fixedly engaged upon the corresponding externally threaded ends of the shaft portions 22. Thus, the rotor is mounted upon and fixedly secured to the two shaft sections for rotation with the latter.

Intermediate the side walls of the rotor and disposed medially of the rotor is a partition member 34 which thus divides the interior of the rotor into two combustion chambers 36 and 38 which are disposed in side-by-side relation. The partition and therefore the combustion chambers are disposed perpendicularly and radially of the axis of the shaft 12.

From the peripherally and radially outer edges of the rotor body 30 there are provided discharge reaction nozzles 40, any desired number of these nozzles being provided as desired. As shown in FIGURE 7, these nozzles are generally triangular in cross section, but at their outer ends taper into a rectangular cross section as shown in FIGURE 8. Each nozzle thus communicates with both of the chambers 36 and 38 so that the combustion or exhaust products therefrom, to be hereinafter described, are combined and discharged through a plurality of single nozzles, disposed peripherally and circumferentially about the rotor body. At the outermost end of the nozzles there is provided a non-return discharge or check valve 42 hinged as at 44 to the end of the nozzle. This valve permits the ready discharge of combustion products from the nozzles, but prevents their return.

It will be observed that the nozzles are preferably arcuate in shape and directed backwardly with respect to the direction of rotation, the latter being indicated by the arrow 46 in FIGURE 3.

Forming a part of the stator 14 and surrounding the rotor 10 is a generally cylindrical housing 50, into which the reaction nozzles discharge the products of combustion, and from which the latter are discharged as through a discharge duct 52, see in particular FIGURE 3.

Referring now especially to FIGURES 4-6, attention being invited to the enlarged adjacent shaft portions 22 of the two shaft sections, it will be observed that each shaft portion has an axial passage 60 therethrough which opens at one end into a corresponding chamber 36 or 38 of the rotor body. At the inlet end of each passage there is provided a conventional non-return check valve 62 of the well known poppet valve type, the same being provided with a closing valve spring 64. The arrangement is such that the valve will be opened by the pressure of the combustible mixture supplied behind the same to enable this mixture to be discharged into the chambers 36 or 38. The valve will be spring closed however to prevent possible return of the pressure therethrough after the pressure has been fired in the chambers.

Igniting means are provided operable in timed relation to the introduction of combustible charges into the chambers for igniting the same. This igniting means may conveniently comprise spark plugs 66, each mounted upon the stator and communicating as by a port 65 with an ignition passage 67 which is formed in the exterior surface or circumference of the portion 22 and extends longitudinally by means of the passage 68 in this portion into continuous communication with the chamber 36 or 38. As will be apparent from FIGURES 4 and 6, the arrangement is such that during the relative rotation of the rotor and its shaft sections with respect to the stator and the spark plug 67 carried thereby, that the plug will be caused to register with the interior of a chamber 36 or 38 to permit the ignition of the mixture therein in properly timed relation to the operation of the device by the ignition control means, not shown, but of any conventional and well known construction.

As so far described it will thus be apparent that the mixture is supplied to the combustion chambers within the rotor body and is ignited therein through the agent of instrumentalities carried by the two sections of the shaft upon which the rotor is mounted.

Each of the mixture delivery units 24 comprises a compressor which may conveniently consist of a cylinder 70 having a piston 72 reciprocable therein. The cylinder head 74 is provided with a mixture inlet passage 76 controlled by the conventional spring loaded poppet valve 78. A carburetor 80 of any desired type receives fuel from any desired source through a conduit 82, and with the assistance of the air cleaner 84 delivers a combustible mixture through the intake passage 76 into the cylinder 70. There the mixture is compressed by the piston 72, being discharged through a passage 86 and a port 88 in the stator journal member 20, from whence the mixture is discharged as shown in FIGURES 4 and 5 into the interior or axial passage 60 of the shaft portion 22. It will be noted that the shaft portion has a radially extending opening 90 therein which periodically places the port 88 into communication with the axial passage 60 and thus constitutes a rotary distributing valve by means of which the compressed charges from the unit 24 are delivered in timed relation and in succession to the interior of the shaft section and thereby into the interior of the combustion chambers 36 and 38.

The compressor units are driven by the shaft sections 16 and 18, and for this purpose the shaft sections are provided with crank throws 92 and 94, preferably disposed at 180 degree intervals to each other, and to which the pistons of the units are connected as by connecting rods 96.

It will thus be apparent that the reaction engine in accordance with this invention has a rotary combustion chamber unit into which separate compressors deliver successive charges of a combustible mixture which are fired in alternation therein, this mixture expanding in the combustion chambers and moving radially outwardly from their central inlet to the peripheral discharge nozzles, where they are exhausted into the exhaust manifold housing 50, their reaction causing rotation of the rotor and thus operation of the shaft 12 from which power may be taken in any suitable manner.

The sections of the shaft upon which the rotor is mounted serve not only to transmit power from the rotor, but also serve to drive the compressors for delivering compressed combustible mixtures to the combustion chambers of the rotor; but also serve as the means for delivering these mixtures to the combustion chambers and for timing the ignition thereof therein.

A pair of air blowers 98 driven as by belts 100 are provided to supply cooling air into the exhaust manifold housing 50 whereby to cool the rotor 10.

The valves 42 are automatic in operation, being closed by the pressure within the housing 50 until they are opened by the pressure within their nozzles 40 exceeding the pressure within housing 50.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A reaction motor of the internal combustion type comprising a shaft, means supporting said shaft, a reaction rotor supported upon said shaft and mounted for rotation about the axis of said shaft, said rotor including a body having a pair of combustion chambers therein, means for delivering combustible mixtures to each of said chambers, a reaction nozzle mounted upon said body and projecting therefrom radially of the shaft axis and having its outlet directed rearwardly of the direction of rotation of said body, said nozzle including passageways each separately communicating a combustion chamber with said outlet, said shaft including a pair of alined sections, said body being disposed between and mounted upon the adjacent ends of said sections, said sections including each a passage means delivering a combustible mixture to one of said chambers, each section having an igniter mounted adjacent thereto and having means for communicating said igniter with a chamber intermittently in timed sequence for igniting a combustible mixture therein.

2. The combination of claim 1, wherein each section includes an axial valved passage discharging a combustible mixture into one of said chambers, said communicating means comprising a longitudinally extending peripheral channel having one end registrable with the corresponding igniter and the other end in communication with said one of said chambers.

3. The combination of claim 1, wherein said body is fixed to said shaft and the latter is rotatable, said mixture delivering means comprising a pair of compressors disposed on opposite sides of said body, driving means connecting each compressor to said shaft.

4. The combination of claim 1, wherein said body is fixed to said shaft and the latter is rotatable, said mixture delivering means comprising a pair of compressors disposed on opposite sides of said body, driving means connecting each compressor to said shaft, each compressor comprising a cylinder having a reciprocating piston therein, means for supplying a fuel and air mixture into said cylinder.

5. The combination of claim 1, wherein said body is fixed to said shaft and the latter is rotatable, said mixture delivering means comprising a pair of compressors disposed on opposite sides of said body, driving means connecting each compressor to said shaft, each compressor comprising a cylinder having a reciprocating piston therein, means for supplying a fuel and air mixture into said cylinder, said combustible mixture delivery means including a passage from said cylinder to said shaft, an axial passage in said shaft communicating with one of said chambers, said shaft including a distributing valve controlling flow of combustible mixture from said compressor into said chamber.

6. The combination of claim 5, including a non-return valve in said axial passage.

7. The combination of claim 1, wherein said body is fixed to said shaft and the latter is rotatable, said mixture delivering means comprising a pair of compressors disposed on opposite sides of said body, driving means connecting each compressor to said shaft, a non-return valve controlling flow through said reaction nozzle.

8. The combination of claim 1, including an annular stationary exhaust housing enclosing said rotor.

9. The combination of claim 1, wherein said shaft is rotary and said rotor is fixedly secured thereto, a stator in which said shaft is journaled, said means for delivering combustible mixtures being mounted upon said stator.

10. A reaction motor of the internal combustion type comprising a shaft, means supporting said shaft, a reaction rotor supported upon said shaft and mounted for rotation about the axis of said shaft, said rotor including a body having a pair of combustion chambers therein, means for delivering combustible mixtures to each of said chambers, at least one reaction nozzle mounted upon said body and projecting therefrom radially of the shaft axis and having its outlet directed rearwardly of the direction of rotation of said body, said nozzle including passageways each separably communicating a combustion chamber with said outlet, said shaft including a pair of aligned sections, said body being disposed between and mounted upon the adjacent ends of said sections, an igniter mounted adjacent each section, each of said sections having means communicating said delivery means with one of said chambers and means communicating each of said igniters with a chamber for igniting the combustible mixture therein, said communicating means each comprising a passage in each of said sections intermittently in timed sequence communicating said igniter and said delivery means with one of said chambers.

11. The combination of claim 10 including a non-return check valve in each of said passages communicating said delivery means with said chambers.

12. The combination of claim 10 including a non-return check valve in each of said passages communicating said delivery means with said chambers, said body being fixed to said shaft and the latter being rotatable, said mixture delivering means comprising a pair of compressors disposed on opposite sides of said body, driving means connecting each compressor to said shaft.

13. A reaction motor of the internal combustion type comprising a shaft, means journalling said shaft, a reaction rotor supported upon said shaft and mounted for rotation about the axis of said shaft, said rotor including a body having at least one combustion chamber therein, means for delivering combustible mixtures to said chamber, at least one reaction nozzle mounted upon said body and projecting therefrom radially of the shaft axis and having its outlet directed rearwardly of the direction of rotation of said body, said nozzle communicating with said combustion chamber, and an igniter mounted adjacent said shaft, means intermittently communicating said delivery means with said chamber and means intermittently communicating said igniter with said chamber for igniting the combustible mixture therein.

14. The combination of claim 13 wherein said first mentioned communicating means includes a passage in said shaft intermittently and in timed sequence communicating said delivery means with said chamber.

15. The combination of claim 14 including a non-return check valve in said passage comprising said delivery means.

16. The combination of claim 13 wherein said first-mentioned communicating means includes a passage in said shaft intermittently and in timed sequence communicating said delivery means with said chamber, a non-return check valve in said passage, said body being fixed to said shaft and the latter being rotatable, said mixture delivery means comprising a compressor disposed on one side of said body, driving means connecting said compressor to said shaft.

17. The combination of claim 13 wherein said second mentioned communicating means includes a passage in said shaft intermittently and in timed sequence communicating said igniter with said chamber.

References Cited in the file of this patent

UNITED STATES PATENTS

| | | |
|---|---|---|
| 727,698 | Schenck | May 12, 1903 |
| 762,175 | Lees | June 7, 1904 |
| 880,458 | Krause | Feb. 25, 1908 |
| 1,161,140 | Lazarides | Nov. 23, 1915 |
| 1,300,903 | Wheless | Apr. 15, 1919 |
| 2,289,900 | Braga | July 14, 1942 |

FOREIGN PATENTS

| | | |
|---|---|---|
| 231,560 | Germany | Apr. 6, 1925 |
| 305,695 | Great Britain | Jan. 7, 1921 |